Aug. 29, 1939. J. H. RICE Re. 21,190

CIRCULAR KNITTING MACHINE FOR DROP-STITCH WORK

Original Filed Aug. 25, 1937 4 Sheets-Sheet 1

Inventor.
John H. Rice
by Heard Smith & Tennant.
Attys.

CIRCULAR KNITTING MACHINE FOR DROP-STITCH WORK

Original Filed Aug. 25, 1937 4 Sheets-Sheet 2

Inventor.
John H. Rice
by Heard Smith & Tennant.
Attys.

Aug. 29, 1939. J. H. RICE Re. 21,190

CIRCULAR KNITTING MACHINE FOR DROP-STITCH WORK

Original Filed Aug. 25, 1937 4 Sheets-Sheet 3

Inventor.
John H. Rice
by Heard Smith & Tennant.
Attys.

CIRCULAR KNITTING MACHINE FOR DROP-STITCH WORK
Original Filed Aug. 25, 1937 4 Sheets-Sheet 4
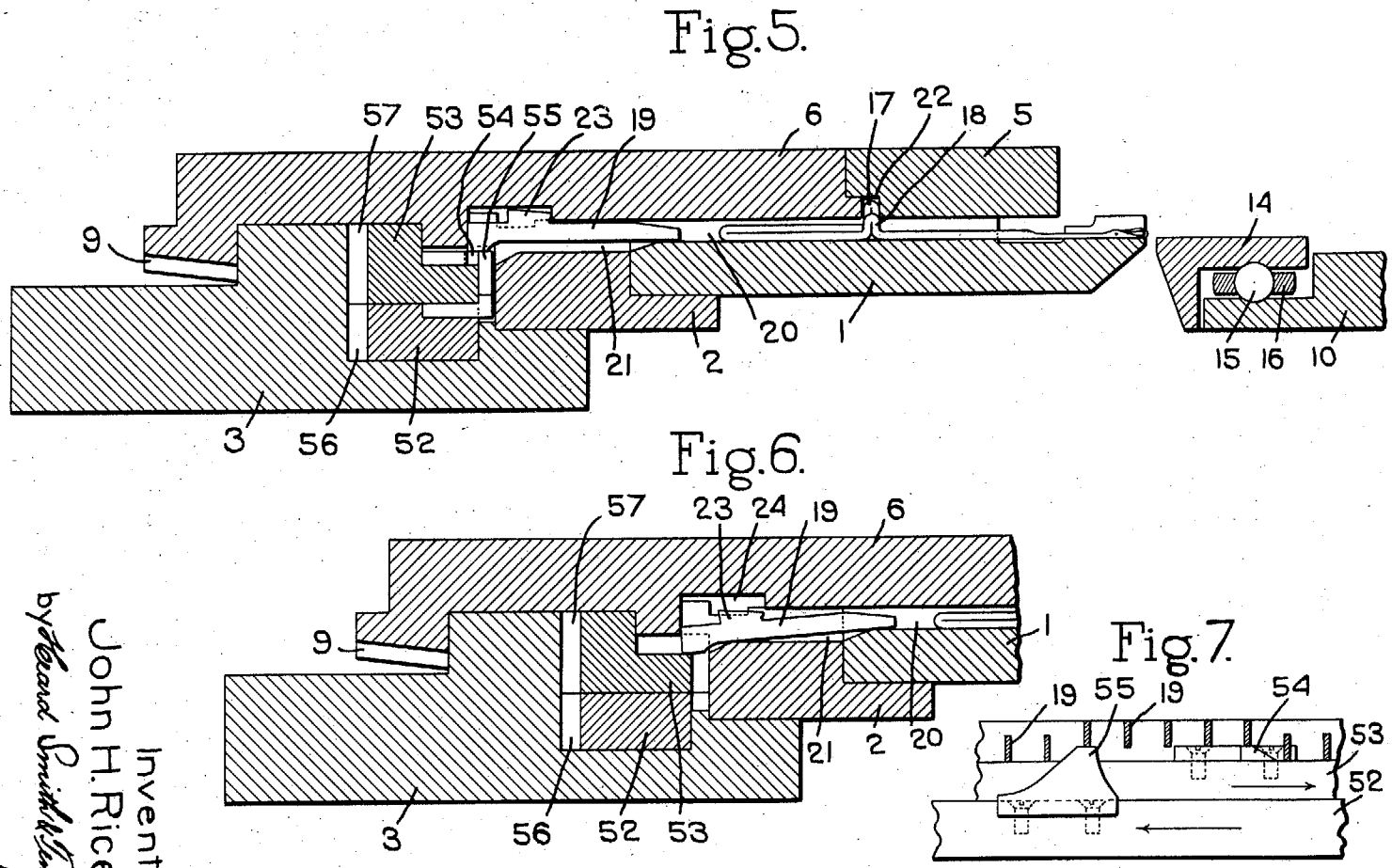
Inventor.
John H. Rice
by Heard Smith & Tennant.
Attys.

Reissued Aug. 29, 1939 Re. 21,190

UNITED STATES PATENT OFFICE 21,190

CIRCULAR KNITTING MACHINE FOR DROP-STITCH WORK

John H. Rice, Manchester, N. H., assignor to Leighton Machine Company, Manchester, N. H., a corporation of New Hampshire Original No. 2,132,046, dated October 4, 1938, Serial No. 160,839, August 25, 1937. Application for reissue June 8, 1939, Serial No. 278,088

22 Claims. (Cl. 66—31)

This invention relates to a circular knitting machine for knitting drop-stitch work, that is, a web of fabric in which at required places certain of the needles do not knit and consequently no stitches are formed in the web thereby and the yarn extends across the path of the said needles. This class of work is desirable for many purposes and is useful in the knitting of such garments as women's girdles. When such a web is knit with an elastic yarn included in the web or various sections thereof, the drop-stitch portion of the web is more readily contractable and expansible.

The object of the invention is further to provide means by which a web containing drop stitches may be knit with the drop-stitch portion arranged in various patterns either of a symmetrical or a non-symmetrical character and extending at desired portions lengthwise of the web.

The object of the invention is further to provide means for securing a substantial locking of the cast-off stitches at the points where the drop-stitch work begins in the web.

The object of the invention is further to provide means for preventing wear or abrasion of the knitted web where it passes between a central circular support and a concentric needle bed in a circular knitting machine.

The invention in its preferred form presents a very simple and efficient construction of circular knitting machine by means of which a cylindrical knitted web containing a practically limitless variety of patterns of drop-stitch work may be continuously and readily knit.

These and other objects and features of the invention will appear more fully in the accompanying description and drawings and will be particularly pointed out in the claims.

The drawings represent a circular knitting machine embodying a preferred form of the invention.

In these drawings:

Fig. 5 is an enlarged detail in radial, vertical cross section of a portion of the machine taken through one of the needle grooves carrying a short butt needle and aligned jack with the jack in active position.

Fig. 6 is a view similar to Fig. 5 with the jack in inactive position.

Fig. 7 is a detail in side elevation illustrating the movement of the jack-restoring cams and with certain jacks shown in cross section.

Figs. 8 and 9 are fragmentary top plan views of the machine showing mechanisms for operating the movable needle cams.

Figure 1:
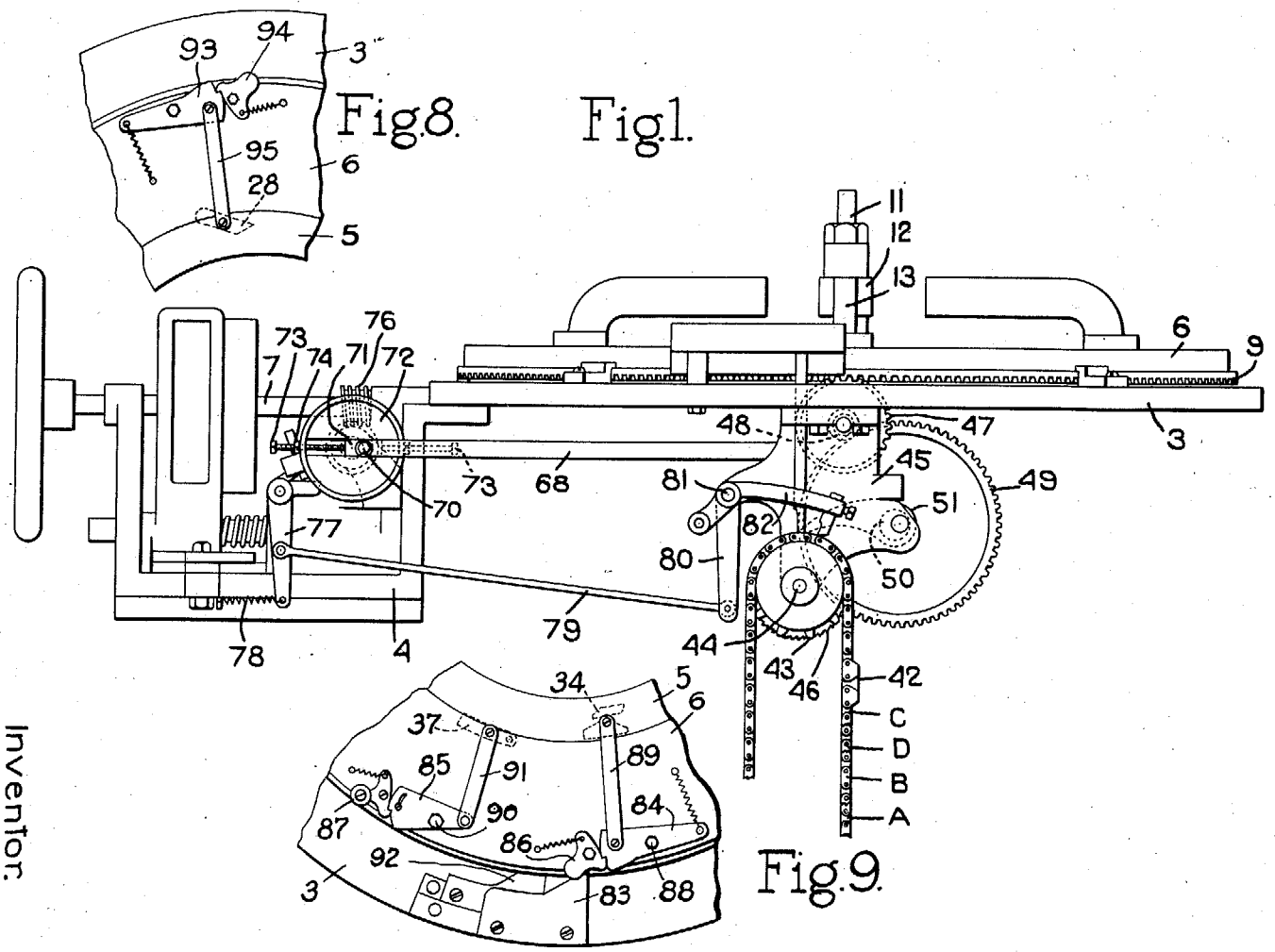
Fig. 1 is a side elevation of the knitting machine with parts removed which are unnecessary to a disclosure of the invention.

The general type of circular knitting machine herein illustrated for the purpose of disclosing a preferred form of the invention is well known and familiar to those skilled in the knitting art and needs no detailed description except with respect to the features with which the invention is particularly concerned. For this reason the various yarn guides and feeds, tension devices, plating mechanisms and other adjuncts have been omitted for the sake of clearness. The machine is, however, desirably equipped with means for feeding as required both a body yarn and a plating yarn and with one of these yarns of an elastic nature, such as the well-known Lastex yarn.

The machine as illustrated comprises a circular needle bed of the flat type and preferably composed of the concentric annular plates 1 and 2. This needle bed is rigidly mounted in an annular support 3 carried on the bracket or stand 4 in which is mounted the driving mechanism. A circular cam plate conveniently composed of the concentric sections 5 and 6 is mounted on the support 3 above and concentric with the needle bed. The cam plate has a rotation relatively to the needle bed, and as in this case the needle bed is fixed in position, the cam plate rotates with respect thereto. This rotation is secured from the main shaft 7 of the machine journalled in the stand 4 by means of a bevel gear 8 on the main shaft cooperating with a bevel gear 9 formed on the under periphery of the cam plate.

The usual central, circular support concentric the needle bed and rotatable with the cam plate and between which and the inner periphery of the needle bed the knitted web passes is provided. This central support, however, involves an important feature of the invention. The body 10 of this support is carried by the stud or vertical shaft 11 mounted in the hub 12 of an arch 13 secured to the top of the cam plate. In the construction of this invention, the central circular support 10 is provided with a peripheral polished steel ring 14 of general L-shaped cross section, as shown in Fig. 5, and an anti-friction bearing is interposed between this peripheral ring and the support. Such an anti-friction bearing is shown as a series of balls 15 carried by a cage 16 with the balls riding in opposed grooves in the peripheral ring and support. With this construction the peripheral ring does not rotate with its support but is held stationary by reason of the frictional engagement between it and the knitted work and the needles so that there is no tendency to wear or chafe the knitted web as it passes down between the needle bed and central support.

The needle bed is provided throughout with a series of radial grooves and for cooperating with these grooves there is provided two sets of needles. One set of these needles is herein referred to as "regular" needles and these are illustrated of the usual type and provided with relatively long butts 17. The other set of needles is herein referred to as "special" needles and, as illustrated, they have relatively short butts 18 and each has associated therewith an aligned jack 19. The special, or short butt, needles with their aligned jacks form drop stitches when the jacks are in inactive position and knit along with the regular needles in the regular manner when the jacks are in active position.

The arrangement of the needles may be varied as desired when the machine is set up for knitting, that is, the regular needles and the special needles with their aligned jacks may be grouped as required with any desired number of either in any group. In the illustrated machine, they are shown with one special needle and aligned jack alternating with two regular needles throughout the needle bed. The knitting pattern may further be varied by omitting needles at different points to form stripes.

In the construction illustrated, both the regular and the special or long and short butt needles operate in grooves 20 in the plate 1 of the needle bed while the jacks extend into grooves 21 in the plate 2 of the needle bed. The needle butts travel in a circular groove 22 in the cam plate between the controlling cams and the jacks are provided with butts 23 which, when the jacks are in active position, travel in a circular groove 24 in the cam plate between the controlling cams.

There are at least two yarn feeding points with cams for controlling the movements of the needles and jacks but, with the larger size machines, the number of feeds and cams may be repeated.

The arrangement is such that, first, the various cams have a relative position such as to effect at each of the two knitting points the knitting movements of the regular or long butt needles and of those special or short butt needles and aligned jacks whose jacks are in active position to cause all of the said needles to knit regular work; second, means are provided for moving the said jacks to inactive position, thus leaving the special or short butt needles under the control of the butt engaging cams at the knitting points; third, the various cams then take a second relative position which is maintained for a predetermined number of rotations to effect at one of the knitting points the knitting movement of the regular or long butt needles only and at the other knitting point the knitting movements of the special or short butt needles only, with the result that the regular and special needles knit alternately at the two knitting points; fourth, the various cams then take a third relative position during one rotation to effect at one of the knitting points movements of the special needles only, causing these needles to cast off their stitches; fifth, the cams are then restored to their first relative position so that thereafter, and as long as this position remains in effect, only the regular or long butt needles knit and drop-stitch work is formed where the special needles are located; sixth, thereafter, under the control of the pattern mechanism, selected jacks associated with the special or short butt needles are restored to active position and, as they come into active position, their aligned special or short butt needles proceed to knit along with the regular, or long butt needles, regular knitted work. It will thus be seen that a wide variety of drop-stitch work may be effected in the knitted web under the control of these various mechanisms.

Figure 3:
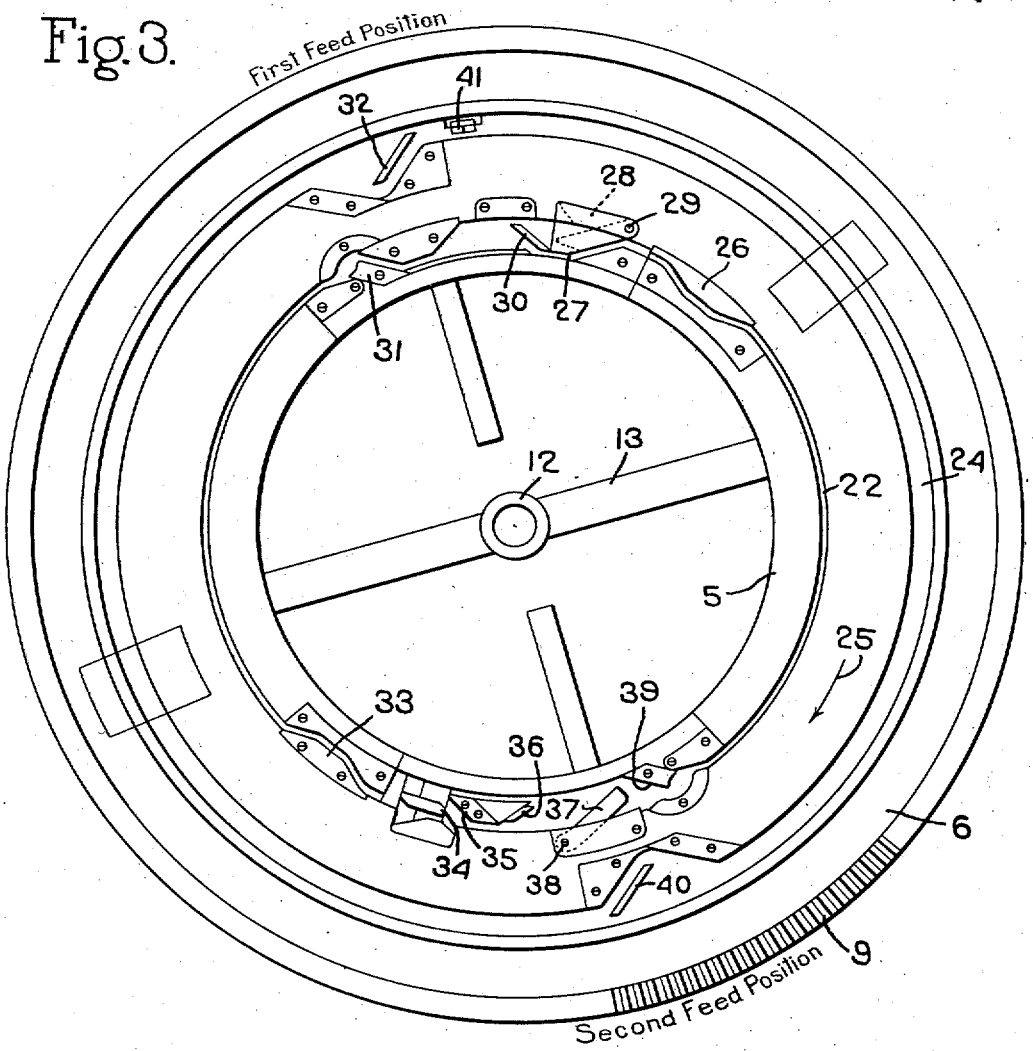
Fig. 3 is a bottom plan view of the cam plate.
Figure 4:
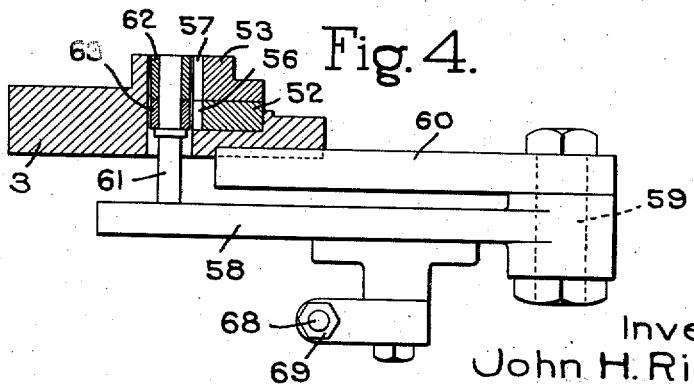
Fig. 4 is an elevation partially in vertical cross section of the construction for operating the jack-restoring cams.

In Fig. 3 there is illustrated a simple and preferred arrangement of cams for controlling the movements of the needles and jacks. The cam plate is assumed to be rotating in the direction of the arrow 25. At the beginning of the "first feed position", there is located the usual cam 26 for opening the needle latches, this cam being deep enough to engage both the long and short butt needles. Next is located a fixed cam 27 deep enough to engage the long butts but not to engage the short butts. A swing cam 28 pivoted at 29 deep enough to engage the short butts normally stands withdrawn but is movable under the control of the pattern mechanism into parallelism with the fixed cam 27. Next comes a splitting cam 30 deep enough to engage the short butts. Next comes the main retracting cam 31 deep enough to engage the short butts. Various guard cams are provided as usual. In the path of the jack butts at this first feed position, a projecting cam 32 is located to engage the jack butts before the jacks reach the knitting point.

At the beginning of the "second feed position", there is located the usual cam 33 for opening the needle latches, this cam being deep enough to engage both the long and short butt needles. Next is located a radially slidable cam 34 under the control of the pattern mechanism. This cam normally stands at its outward position, as shown in the drawings. It is deep enough to engage the short butts so that in its outward position all the needles pass through it without movement. Next is located a fixed retracting cam 35 of sufficient depth to engage the long butts but not the short butts. Next is located a fixed splitting cam 36. This cam is of sufficient depth to engage the short butts. When, therefore, the slide cam 34 is in its inner position, the long butts passing through the slide cam engage the retracting cam 35 and are retracted, while the short butts pass over the retracting cam 35, engage the splitting cam 36 and are projected. Next is located a swing cam 37 pivoted at 38 and under the control of the pattern mechanism. This cam is deep enough to engage the long butts but not the short butts. Normally it stands in the inner position illustrated but may be swung back out of position. Next is located the main retracting cam 39 deep enough to engage the short butts. Here again the various guard cams are provided and need no description. In the path of the jack butts at this second feed position a projecting cam 40 is located to engage the jack butts before the jacks reach the knitting point.

The manner in which these various cams act to effect the knitting operations already generally described will now be apparent. The first relative position of the cams is that illustrated in Fig. 3, that is, at the first feed position, the swing cam 28 is out and, at the second feed position, the slide cam 34 is out and the swing cam 37 is in. Consequently as the long butt needles pass through the first feed position, they are projected by the fixed cam 27 and retracted by the main knitting cam 31 and knit, while the short butt needles and their aligned jacks are projected by the jack-projecting cam 32 and retracted by the main retracting cam 31 acting on the needle butts and these needles knit. At the second feed position, the long butt needles are projected by the swing cam 37 and retracted by the main retracting cam 39 and knit, while the short butt needles and aligned jacks are projected by the jack-projecting cam 40 and retracted by the main retracting cam 39 acting on their needle butts and knit. Both sets of needles knit at both feed points and regular knitted work is formed by all the needles.

When it is desired to change to drop-stitch work, it is necessary to lock the drop stitches so far as possible against raveling and this is secured by the following operations:

When the drop-stitch work is to begin, a jack-depressing cam 41, located just before the projecting cam 32, is operated under the control of a pattern mechanism to depress the jacks and render them inactive. A second relative position of the cams is now effected, the slide cam 34 being moved in and the swing cam 37 being moved out under the control of pattern mechanism. Consequently, as there is now nothing to project the special or short butt needles at the first feed position, they pass this position without knitting, while the long butt needles knit at this position. At the second feed position, the special or short butt needles, no longer under the control of their jacks, are projected by the splitting cam 36 and retracted by the main retracting cam 39, thus being rendered temporarily active, and knit, while the regular or long butt needles which have been retracted by the fixed retracting cam 35 remain retracted and pass this position without knitting. The two courses thus formed may be repeated, that is, with the special or short butt needles not knitting and the regular or long butt needles knitting at the first feed position and the special or short butt needles knitting and the regular or long butt needles not knitting at the second feed position.

After these two courses or their repetition, the stitches are cast off from the special or short butt needles. To do this, the cams assume the third relative position for a single rotation. For this position the swing cam 28 is moved in and the slide cam 34 and the swing cam 37 are restored to their normal positions under the control of the pattern mechanism. Hence, as the long butt needles pass the first feed position, they knit as before, while the special or short butt needles are projected by the swing cam 28 which directs them against the splitting cam 30 which in turn retracts them and accordingly they cast off their stitches. At the second feed position, the regular or long butt needles knit as normally, but the special or short butt needles do not knit because their butts pass outside the splitting cam 36 and their jacks are inactive.

The first relative position of the cams, namely, that illustrated in Fig. 3, is now resumed under the control of the pattern mechanism which is effected by moving the swing cam 28 to its outward or normal position. Consequently, at both feed positions, the regular or long butt needles knit while the special or short butt needles do not knit, thus forming drop-stitch work wherever the special or short butt needles are located.

Thereafter the pattern of the work may be varied by restoring to active position selected jacks and thereupon the special or short butt needles corresponding thereto will knit regular work along with the regular or long butt needles because all of the cams are now in the normal position. Before such restoration of selected jacks begins under the control of pattern mechanism, the jack-depressing cam 41 is automatically raised.

The automatic or pattern-controlling mechanisms for operating the various cams and for controlling the restoration of the jacks to active position may be of standard forms and, as herein illustrated, involve nothing specifically novel except in the case of the mechanism for selectively restoring the jacks to active position. The pattern mechanisms employed for illustrating the preferred embodiment of the invention in the control of the various cams are similar to those illustrated in the patent to Rice, No. 1,215,411, February 13, 1917.

In this construction four pattern chains A, B, C, D, each provided with suitable risers 42, are mounted respectively on sprocket wheels 43 secured to the shaft 44 journaled in a bracket 45 suspended from the annular support 3. The shaft 44 is driven by a ratchet wheel 46 secured thereto and this ratchet wheel is rotated step by step from the cam plate. For this purpose the gear 9 on the periphery of the cam plate meshes with a gear 47 carrying a pinion 48, which pinion meshes with a gear 49, the said gears and pinion being journalled in the bracket 45. The gear 49 has secured thereto an eccentric 50 fitting in a pawl 51 which cooperates with the ratchet wheel 46.

The pattern chain D may be employed for the control of the plating or elastic yarn or for any other desired purpose. The pattern chain A, by means of suitable risers, acts to move down the jack-depressing cam 41 which moves the jacks to inactive position and also operates to shift the slide cam 34 to its innermost and outermost positions and also to shift the swing cam 37 to its innermost and outermost positions. The pattern chain B, by means of suitable risers, operates to raise the jack-depressing cam to its idle or operating positions and also to move the swing cam 28 to its innermost and outermost positions. These various cams are shifted from the respective pattern chains by the usual type of risers and levers, such, for example, as shown in the patent to Rice, and need no further description.

The pattern chains, of which four are indicated in Fig. 1, stand one behind the other and the pattern chains A, B and D act on risers 82 which stand one behind the other, viewing Fig. 1. As in the aforesaid patent to Rice, a riser 82 operated by the pattern chain A raises and lowers the cam 83, see Fig. 9, so that this cam may be brought either into the plane of the levers 84 and 85 or the higher plane of the dogs 86 and 87. The lever 84 is pivoted to the cam plate section 6 at 88 and connected by a link 89 to the slide cam 34. The lever 85 is pivoted at 90 to the cam plate section 6 and connected by a link 91 to the swing cam 37 and cooperating with these levers 84 and 85 are the pivoted dogs 86 and 87, all as shown in further detail in the aforesaid patent to Rice. It will thus be seen that when the cam 83 is moved into the plane of the levers 84 and 85, the rotation of the cam plate will cause these levers as they come into engagement with the cam 83 to move the slide cam 34 in and the switch cam 37 out, and that when the cam 83 shifts to the higher plane of the dogs 86 and 87, the rotation of the cam plate will cause these dogs to be unlocked by the cam 83 and the cams 34 and 37 to move in the opposite direction, that is, the slide cam 34 out and the swing cam 37 in. In a similar manner, another riser 82 operated by the pattern chain B moves a cam 92 either into the plane of a similar lever 93 or into the higher plane of a similar dog 94, see Fig. 8. In this case the lever 93 is connected by a link 95 to the swing cam 28 so that as the cam plate rotates, the swing cam 28 will be moved either in or out according as the cam 92 is in the plane of the lever 93 or in the plane of the dog 94.

The mechanism for operating the selective restoration of the jacks to active position, as illustrated, conveniently makes use of some of the elements illustrated in the aforesaid patent to Rice there employed for racking and is under the control of the pattern chain C.

Upon the annular support 3 and between it and the cam plate 6 and concentric with the needle bed are mounted two superimposed rotatable rings 52 and 53. These rings are provided at their inner periphery with one or more sets of cams, one such set being shown in Figs. 5 and 7. The upper ring 53 has secured thereto the cam 54, beveled toward the right, viewing Fig. 7, extending beneath the rear end of the jacks and of a width circumferentially to stand between successive jacks when in idle position. The cam 55 is secured to the lower ring 52, projects upward inside of the ring 53 beneath the path of the end of the jacks, and close to the cam 54. This cam is beveled toward the left, viewing Fig. 7, and is also of a width to stand between successive jacks when in idle position. The cams 54 and 55 stand normally in radial alignment between successive jacks and thus permit the jacks to be moved to depressed or inactive position. When the jacks are to be raised to bring them selectively into active position, the ring 53 is moved to the right and the ring 52 to the left, viewing Fig. 7, in each case to an extent determined by the controlling mechanism and thereupon the selected jacks are cammed upward, one or more at each side of the central position. This gives a symmetrical pattern, but, of course, one ring may be omitted or rendered idle and thereupon the jacks would be raised selectively only at one side of a central position. The ring or rings may move step by step continuously or the movement may be interrupted and resumed for any desired periods under the control of the pattern mechanism.

Figure 2:
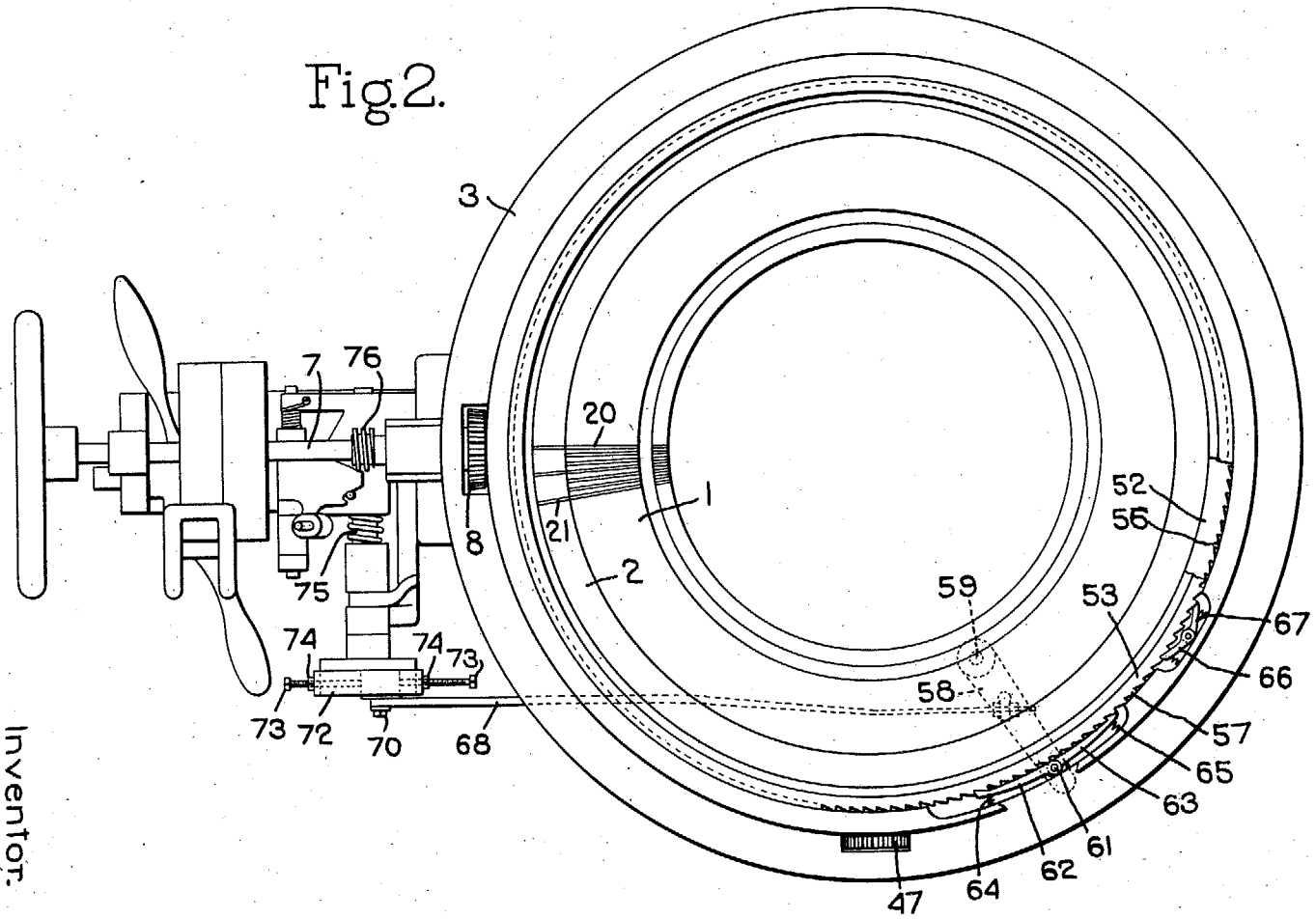
Fig. 2 is a top plan view of the construction shown in Fig. 1 with the cam plate and central circular support removed.

In the construction illustrated, the rings 52 and 53 are provided with ratchet teeth 56 and 57, respectively, with these teeth facing in opposite directions, as indicated in Fig. 2. A lever 58 is fulcrumed at 59 on a stud carried by a bracket 60 secured to the bottom of the annular support 3 and this lever at its outer end carries a stud 61 on which are mounted oppositely disposed pawls 62 co-acting with the teeth 56 of the ring 53 and 63 co-acting with the teeth 57 of the ring 52. Consequently, as the lever 58 swings clockwise, viewing Fig. 2, the ring 53 will be advanced in the same direction and, as it swings counterclockwise, the ring 52 will be advanced in the same direction or opposite to the ring 53. The annular support 3 is suitably recessed to provide for the operation of the pawls and these pawls are spring pressed at 64 and 65 toward the rings. Suitable spring-pressed detent pawls 66 and 67 are also provided in a recess in the annular support 3 cooperating with the respective rings.

The rocking movement of the lever 58 is secured from a connecting rod 68 adjustably secured at its end by the nut 69 to the lever. At the opposite end, the connecting rod 68 is pivoted to a stud 70 carried by a block 71 mounted for adjustment diametrically in a slot of a rotatable disk 72. This diametrical adjustment is shown as secured by set screws 73 threaded into the disk 72, abutting the block 71 and held in position by lock nuts 74. Thus the stud 70 may be given any desired position eccentric the center of rotation of the disk 72 and consequently any desired throw is imparted to the connecting rod 68 upon the rotation of the disk and therefore any required movement given to the pawl-actuating lever 58.

The disk 72 is mounted upon a shaft 75 driven from a worm 76 on the main shaft 7 under the control of a clutching mechanism, such as that illustrated and described in the aforesaid patent to Rice, the clutch engaging to effect the rotation of the shaft upon the movement of the lever 77 in opposition to the spring 78 and disengaging upon the movement of the lever 77 under the influence of the spring 78 in the opposite direction, all as in the said patent. The movement of the lever 77 to effect the clutching action is effected by the connecting rod 79 extending to the bell crank lever 80 fulcrumed at 81 on the stand 45 and controlled by risers such as 42 on the pattern chain C. Thus it will be seen that according to the character and position of the risers 42 and the adjustment of the stud 70, the ring or rings 52 and 53 will be advanced to any required extent at and during any required periods.

Having thus described the invention, what is claimed as new, and desired to be secured by Letters Patent, is:

1. A circular knitting machine for knitting drop-stitch work comprising a set of regular needles, a set of special needles and aligned jacks, a circular needle bed having grooves therein to receive either a regular needle alone or a special needle and aligned jack, a circular cam plate rotatable relatively to the needle bed and provided with cams acting upon said rotation to effect the knitting movements of the regular needles and of those special needles whose jacks are in active position, means for moving said jacks to inactive position, means acting to cause the special needles whose jacks are in inactive position to cast off their stitches and cease knitting and automatically controlled mechanism acting to restore selected jacks to active position to cause the special needles controlled thereby to knit.

2. A circular knitting machine for knitting drop-stitch work comprising the combination defined in claim 1, together with means acting after the said jacks have moved to inactive position to effect the knitting movements of the regular needles alone for one course and the knitting movements of the special needles alone for a succeeding course before the said special needles cast off their stitches, whereby the cast-off stitches are restrained from unraveling.

3. A circular knitting machine for knitting drop-stitch work comprising a set of regular needles, a set of special needles and aligned jacks, a circular needle bed having grooves therein to receive either a regular needle alone or a special needle and aligned jack, a circular cam plate rotatable relatively to the needle bed and provided with cams at each of two knitting points, means for effecting the relative position of said cams to effect at each of said points the knitting movements of the regular needles and of those special needles and aligned jacks whose jacks are in active position, means for moving the said jacks to inactive position, means for effecting a second relative position of said cams for a predetermined number of rotations to effect at one of said points the knitting movements of the regular needles only and at the other of said points the knitting movements of the special needles only, means for effecting a third relative position of said cams for one rotation to effect at one of said points movements of the special needles only to cause the casting off of their stitches, and means for restoring the first relative position of said cams thereafter to effect at each of said points the knitting movements of the regular needles only.

4. A circular knitting machine for knitting drop-stitch work comprising a set of regular needles, a set of special needles and aligned jacks, a circular needle bed having grooves therein to receive either a regular needle alone or a special needle and aligned jack, a circular cam plate rotatable relatively to the needle bed and provided with cams at each of two knitting points, means for effecting the relative position of said cams to effect at each of said points the knitting movements of the regular needles and of those special needles and aligned jacks whose jacks are in active position, means for moving the said jacks to inactive position, means for effecting a second relative position of said cams for a predetermined number of rotations to effect at one of said points the knitting movements of the regular needles only and at the other of said points the knitting movements of the special needles only, means for effecting a third relative position of said cams for one rotation to effect at one of said points movements of the special needles only to cause the casting off of their stitches, means for restoring the first relative position of said cams, and means for restoring selected jacks to active position, thereby to effect at each of said points the knitting movements of the regular needles and of those special needles and aligned jacks whose jacks have been restored to active position.

5. A circular knitting machine for knitting drop-stitch work comprising a set of regular needles, a set of special needles and aligned jacks, a circular needle bed having grooves therein to receive either a regular needle alone or a special needle and aligned jack, a circular cam plate rotatable relatively to the needle bed and provided with cams at each of two knitting points acting normally to effect at each of said points the knitting movements of the regular needles and of those special needles and aligned jacks whose jacks are in active position, and pattern-controlled means acting, first, to move the said jacks to inactive position, second, to effect a relative position of said cams for a predetermined number of rotations to cause the knitting movements of the regular needles only at one of said points and the knitting movements of the special needles only at the other of said points, third, for effecting a relative position of said cams for one rotation to cause the movement of the said special needles only at one of said points to cast off their stitches, and, fourth, to restore the said cams to normal position thereafter to effect at each of said points the knitting movements of the regular needles only.

6. A circular knitting machine for knitting drop-stitch work comprising a set of regular needles, a set of special needles and aligned jacks, a circular needle bed having grooves therein to receive either a regular needle alone or a special needle and aligned jack, a circular cam plate rotatable relatively to the needle bed and provided with cams at each of two knitting points acting normally to effect at each of said points the knitting movements of the regular needles and of those special needles and aligned jacks whose jacks are in active position, and pattern-controlled means acting, first, to move the said jacks to inactive position, second, to effect a relative position of said cams for a predetermined number of rotations to cause the knitting movements of the regular needles only at one of said points and the knitting movements of the special needles only at the other of said points, third, for effecting a relative position of said cams for one rotation to cause the movements of the special needles only at one of said points to cast off their stitches, fourth, to restore the said cams to normal position, fifth, to restore selected jacks to active position, thereby to effect at each of said points the knitting movements of the regular needles and of those special needles and jacks whose jacks have been restored to active position.

7. A circular knitting machine for knitting drop-stitch work comprising a set of long butt needles, a set of short butt needles and aligned jacks having butts, a circular needle bed having grooves therein to receive either a long butt needle or a short butt needle and aligned jack, a cam plate rotatable relatively to the needle bed having separate grooves for the needle butts and for the jack butts with fixed cams at the end of each of two positions for retracting both long and short butt needles by their butts and for projecting and retracting the jacks by their butts and preceding these at the first position a fixed projecting cam engaging only the long butts and a movable projecting cam engaging only the short butts movable into and out of projecting position, a subsequent retracting cam engaging the short butts of needles projected by the movable projecting cam to retract them to cast-off position, and preceding the said fixed cams at the second position a movable cam for projecting both long and short butts, followed by cams respectively for retracting only the long butts and for insuring the projection of the short butts, followed by a movable projecting cam engaging only the long butts movable into and out of projecting position.

8. A circular knitting machine for knitting drop-stitch work comprising the construction defined in claim 7, together with means operable to move the jacks to a position where their butts will not engage the jack-projecting cam at the first position as they approach said cam and for moving the movable cam at the second position into position for projecting both long and short butts and for moving the movable projecting cam at the second position out of projecting position.

9. A circular knitting machine for knitting drop-stitch work comprising the construction defined in claim 7, together with means operable to move the jacks to a position where their butts will not engage the jack-projecting cam at the first position as they approach said cam and for moving the movable cam at the second position into position for projecting both long and short butts and for moving the movable projecting cam at the second position out of projecting position and for thereafter moving the movable projecting cam at the first position into and maintaining it in projecting position during one rotation and for thereafter reversing the positions of the movable cams at both positions.

10. A circular knitting machine for knitting drop-stitch work comprising the construction defined in claim 7, together with means operable to move the jacks to a position where their butts will not engage the jack-projecting cam at the first position as they approach said cam and for moving the movable cam at the second position into position for projecting both long and short butts and for moving the movable projecting cam at the second position out of projecting position and for thereafter moving the movable projecting cam at the first position into and maintaining it in projecting position during one rotation and for thereafter reversing the positions of the movable cams at both positions, together with means for selectively restoring the jacks to a position where their butts will engage the jack-projecting and retracting cams during further rotation.

11. A circular knitting machine for knitting drop-stitch work comprising a set of regular needles, a set of special needles and aligned jacks, the said jacks being movable into active and into inactive positions, the said special needles acting when their jacks are moved to active position to knit regular work and when the jacks are moved to inactive position to drop the stitches and cease knitting, means for moving the jacks to inactive position, and automatically controlled mechanism acting to restore selected jacks to active position to cause the special needles controlled thereby to knit.

12. A circular knitting machine for knitting drop-stitch work comprising a set of regular needles, a set of special needles and aligned jacks, the said jacks being movable into active and into inactive positions, the said special needles acting when their jacks are moved to active position to knit regular work and when the jacks are moved to inactive position to drop the stitches and cease knitting, means for moving the jacks to inactive position, and automatically controlled mechanism acting to restore selected jacks alternately at opposite sides of a central line to active position to cause the special needles controlled thereby to knit.

13. A circular knitting machine for knitting drop-stitch work comprising a set of regular needles, a set of special needles and aligned jacks, the said jacks being movable into active and into inactive positions, the said special needles acting when their jacks are moved to active position to knit regular work and when the jacks are moved to inactive position to drop the stitches and cease knitting, means for moving the jacks to inactive position, and automatically controlled mechanism acting to restore selected groups of jacks to active position to cause the special needles controlled thereby to knit.

14. A circular knitting machine for knitting drop-stitch work comprising a set of regular needles, a set of special needles and aligned jacks, the said jacks being movable into active and into inactive positions, the said special needles acting when their jacks are moved to active position to knit regular work and when the jacks are moved to inactive position to drop the stitches and cease knitting, means for moving the jacks to inactive position, and automatically controlled mechanism acting to restore selected groups of jacks alternately at opposite sides of a central line to active position to cause the special needles thereby to knit.

15. A circular knitting machine for knitting drop-stitch work comprising a set of regular needles, a set of special needles and aligned jacks, a circular needle bed having grooves therein to receive either a regular needle alone or a special needle and aligned jack, a circular cam plate rotatable relatively to the needle bed and provided with cams acting upon said rotation to effect the knitting movements of the regular needles and of those special needles whose jacks are in active position, means for moving said jacks to inactive position, means acting to cause the special needles whose jacks are in inactive position to cast off their stitches and cease knitting, a jack-restoring cam mounted on the cam plate for bodily movement in a circular path concentric the jacks and located between successive jacks when inactive, and pattern-controlled means for moving said cam in its path to restore selected jacks to active position to cause the special needles controlled thereby to knit.

16. A circular knitting machine for knitting drop-stitch work comprising a set of regular needles, a set of special needles and aligned jacks, a circular needle bed having grooves therein to receive either a regular needle alone or a special needle and aligned jack, a circular cam plate rotatable relatively to the needle bed and provided with cams acting upon said rotation to effect the knitting movements of the regular needles and of those special needles whose jacks are in active position, means for moving said jacks to inactive position, means acting to cause the special needles whose jacks are in inactive position to cast off their stitches and cease knitting, two jack-restoring cams mounted on the cam plate for bodily movement in circular paths concentric each other and the jacks and located between successive jacks when inactive, and pattern-controlled means for moving said restoring cams simultaneously in opposite directions to restore to active position oppositely disposed jacks to cause the special needles controlled thereby to knit.

17. Selective jack-restoring means for a circular knitting machine having a circular needle bed with grooves for the jacks and a circular cam plate rotatable relatively to the needle bed and provided with cams for operating the jacks comprising a ring concentric the said bed and cam plate, a cam on said ring, and pattern-controlled means acting to rotate the ring step by step to cause the cam to move the jacks selectively into active position.

18. Selective jack-restoring means as defined in claim 17, together with means for adjusting the amount of rotation imparted to the ring at each step thereby to determine the number of jacks moved into active position at each step.

19. A circular knitting machine having a flat annular needle bed having needle-receiving grooves therein, a cam plate rotatable relatively to the needle bed for operating the needles, a central circular support concentric the needle bed and rotatable with the cam plate, and a peripheral ring carried on the central circular support with an anti-friction bearing interposed between the said ring and the support to enable the ring to remain stationary with the needle bed by frictional engagement with the knitted work and the needles during the rotation of the support.

20. A circular knitting machine having the construction defined in claim 19, in which the peripheral ring is of L-shape in cross section with one flange surrounding the periphery of the central support and with the other flange extending over the central support and with the anti-friction bearing interposed between the latter flange and the central support.

21. A circular knitting machine having the construction defined in claim 19 in which the peripheral ring is of L-shape in cross section with one flange surrounding the periphery of the central support and with the other flange extending over the central support and with the anti-friction bearing interposed between the latter flange and the central support, and in which the anti-friction bearing comprises an annular ball cage and a series of anti-friction balls therein fitting into annular grooves in the said latter flange and the said support.

22. A circular knitting machine for knitting drop-stitch work comprising a set of regular and a set of special needles, a circular needle bed having grooves therein to receive either regular or special needles, means for rendering the special needles inactive, a circular cam plate rotatable relatively to the needle bed, cams on the cam plate, means for automatically relatively positioning the cams on the cam plate, first, to cause all the active needles to knit, second, when the special needles are rendered inactive to cause the regular needles alone to knit for one course and the special needles to become temporarily active and to knit alone for a succeeding course before the special needles cast off their stitches, third, to cause the special needles rendered inactive to cast off their stitches and cease knitting, and automatically controlled mechanism acting to render the inactive special needles active.

JOHN H. RICE.